Aug. 7, 1956  W. F. RIDGWAY  2,757,560
AUTOMATIC DRILLING MACHINE
Filed June 8, 1950  14 Sheets-Sheet 1

INVENTOR
William F. Ridgway
By Carlson, Pitzner, Hubbard & Wolfe
ATTORNEYS

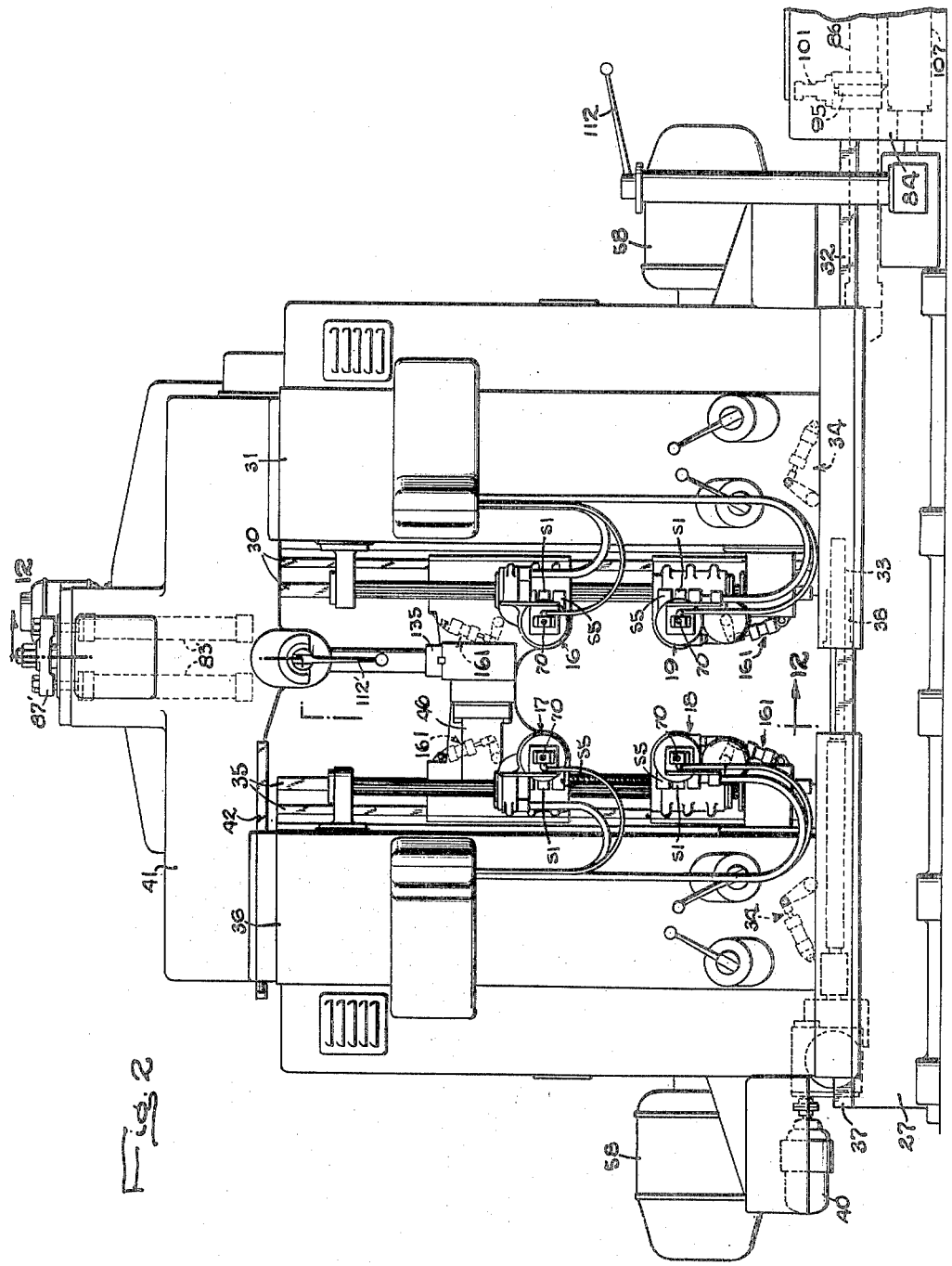

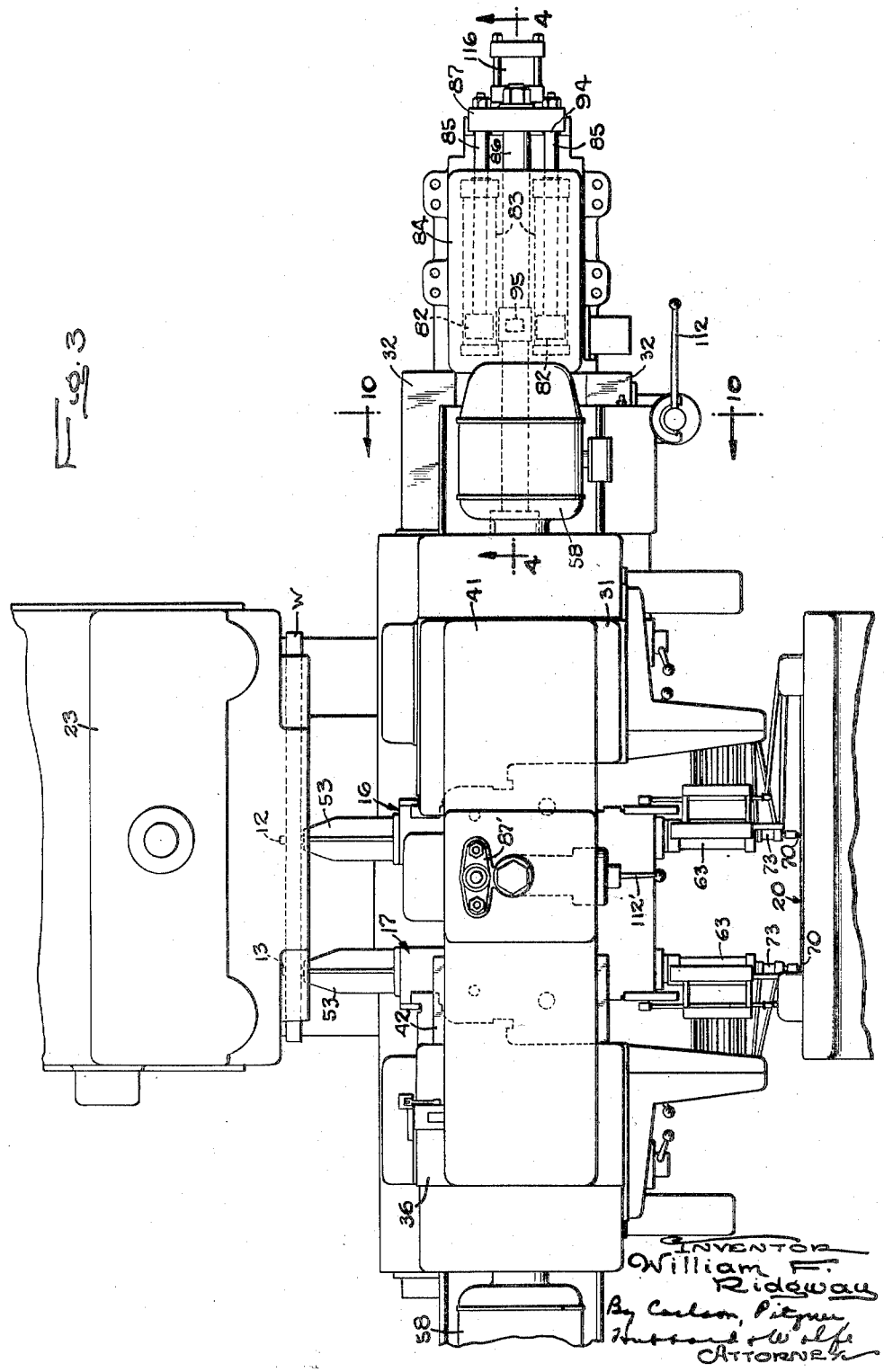

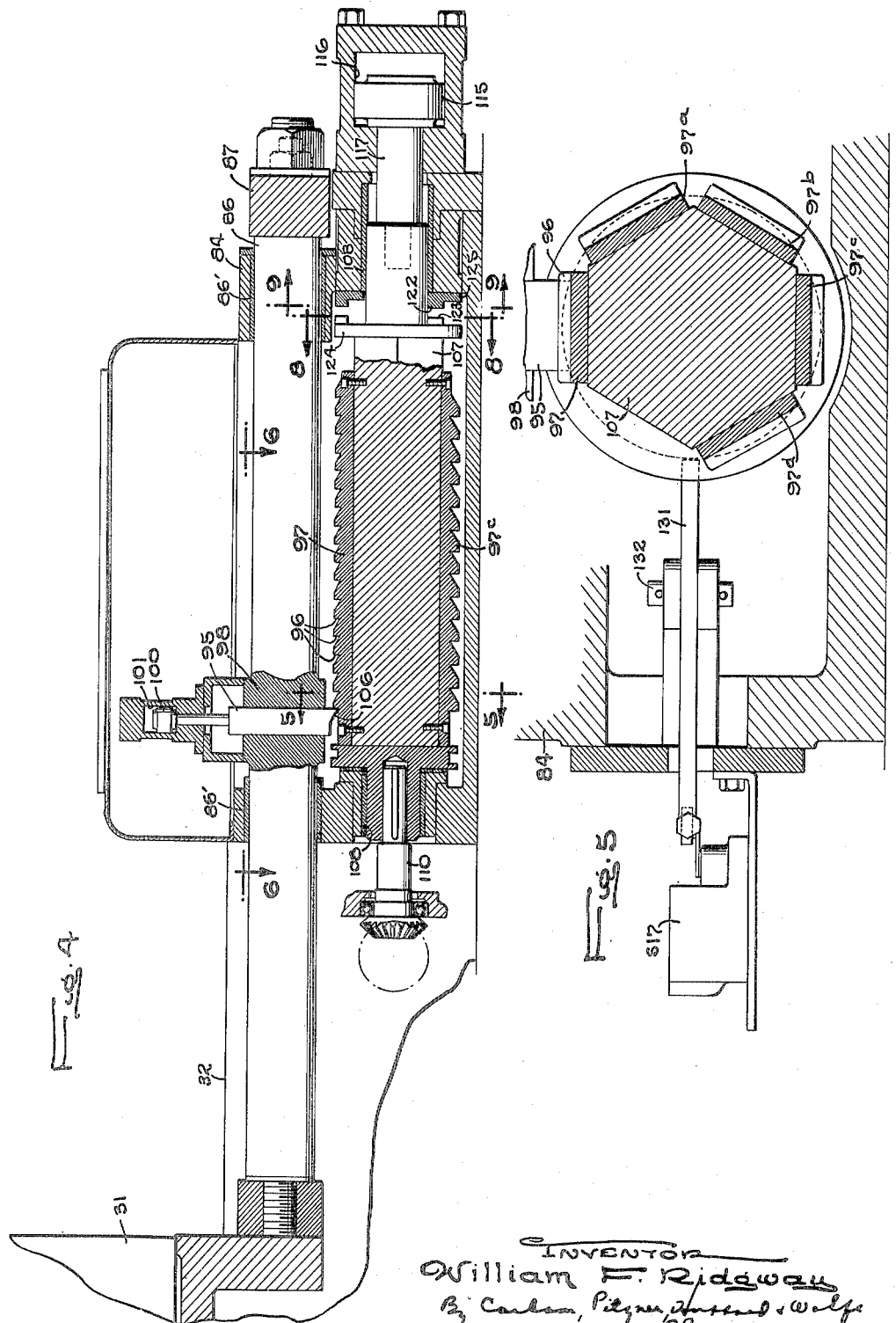

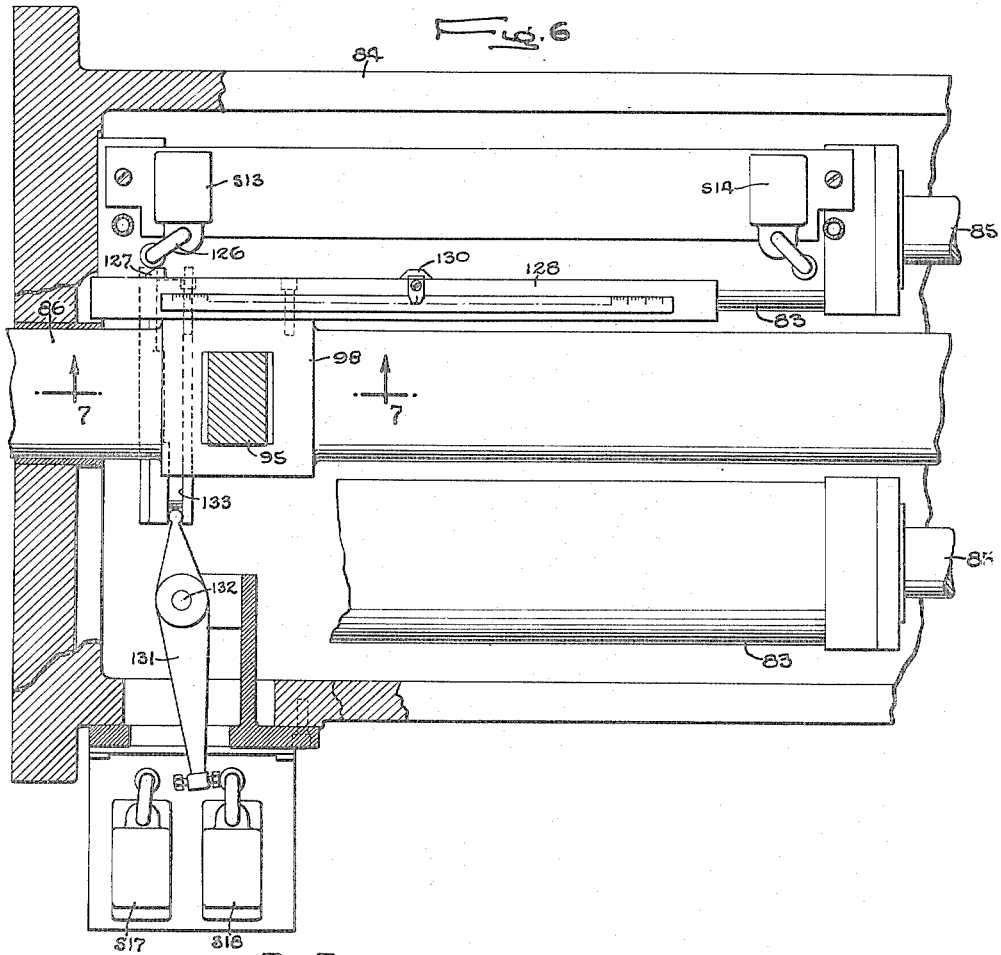
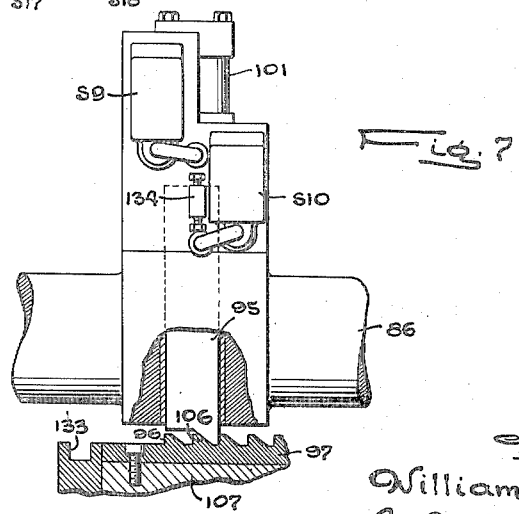

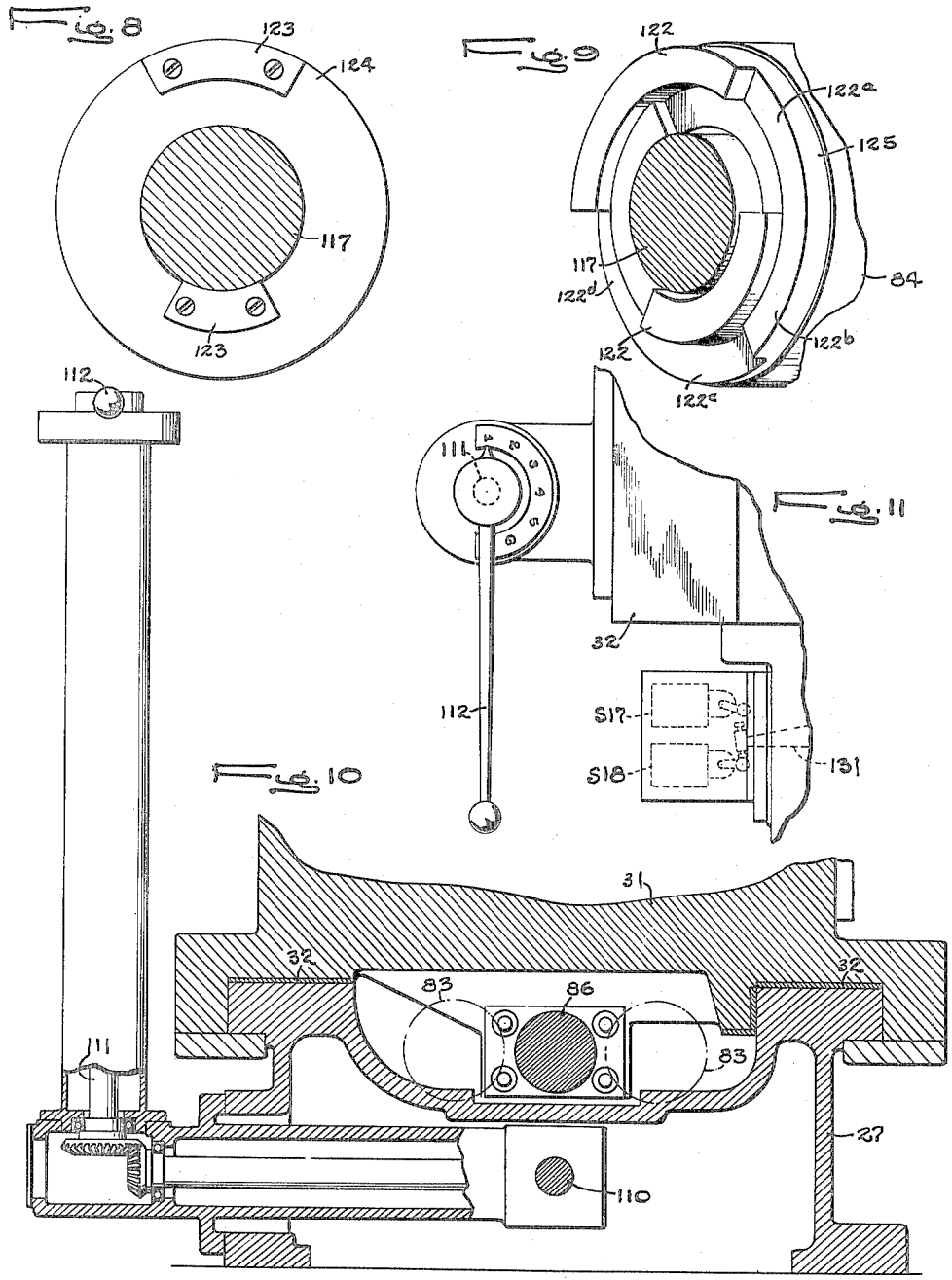

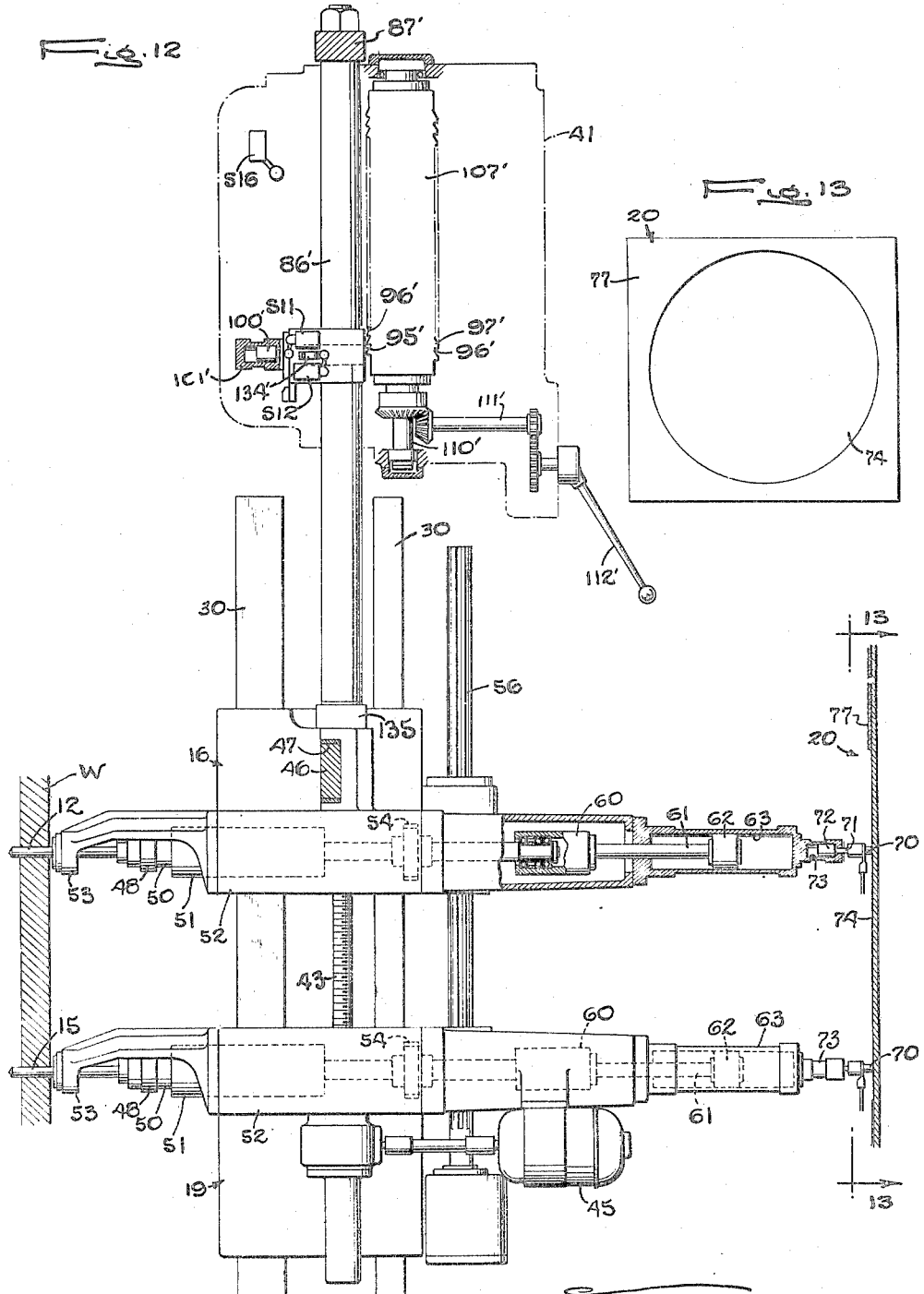

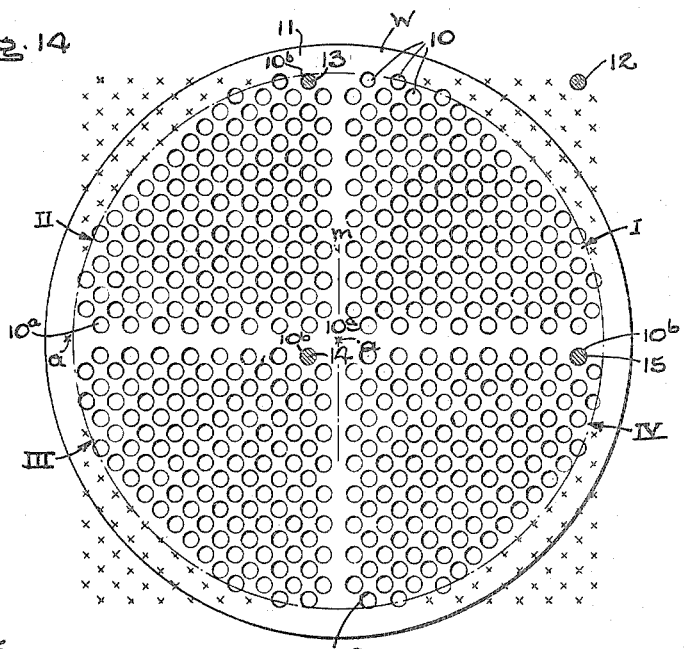
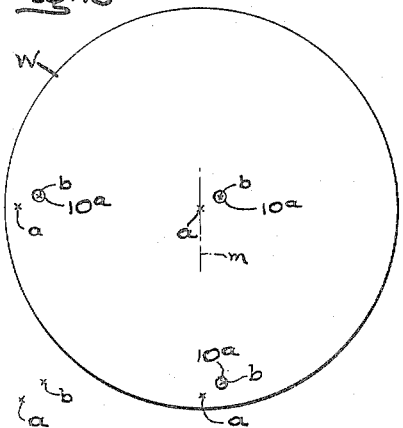
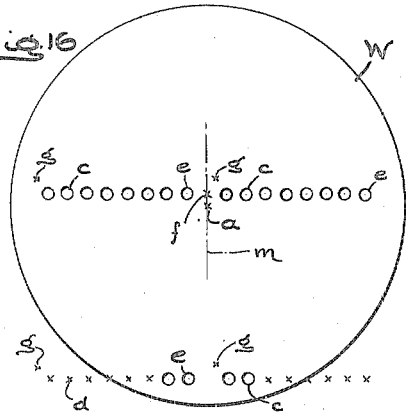
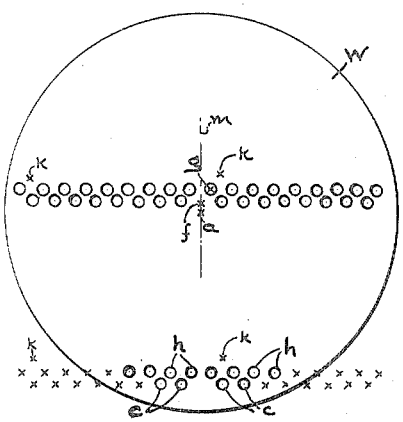

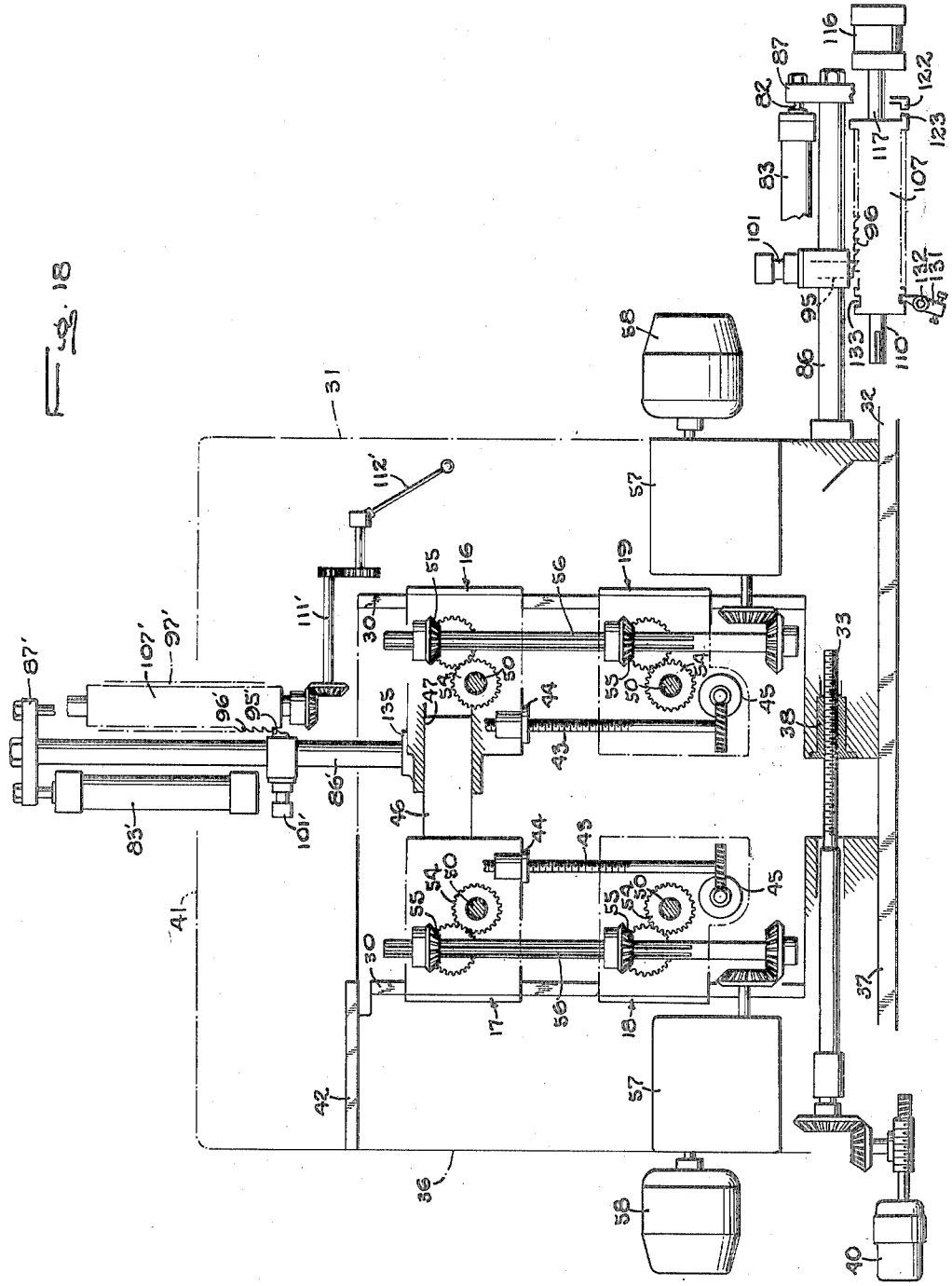

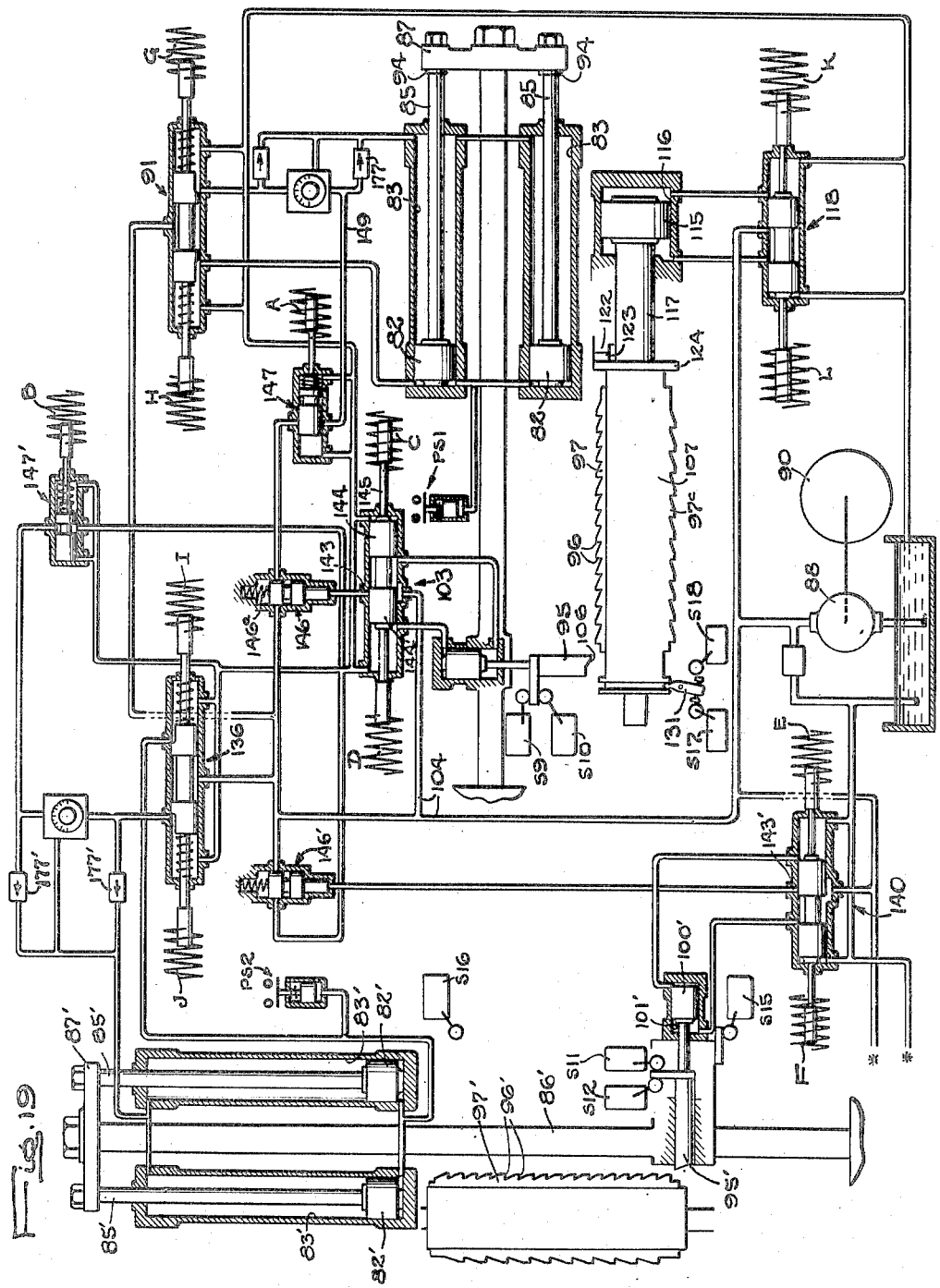

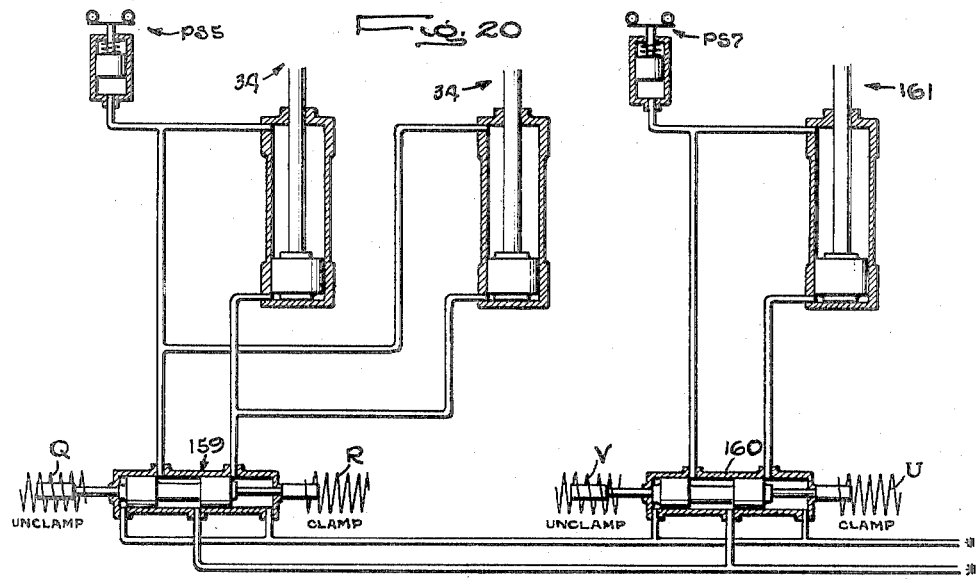
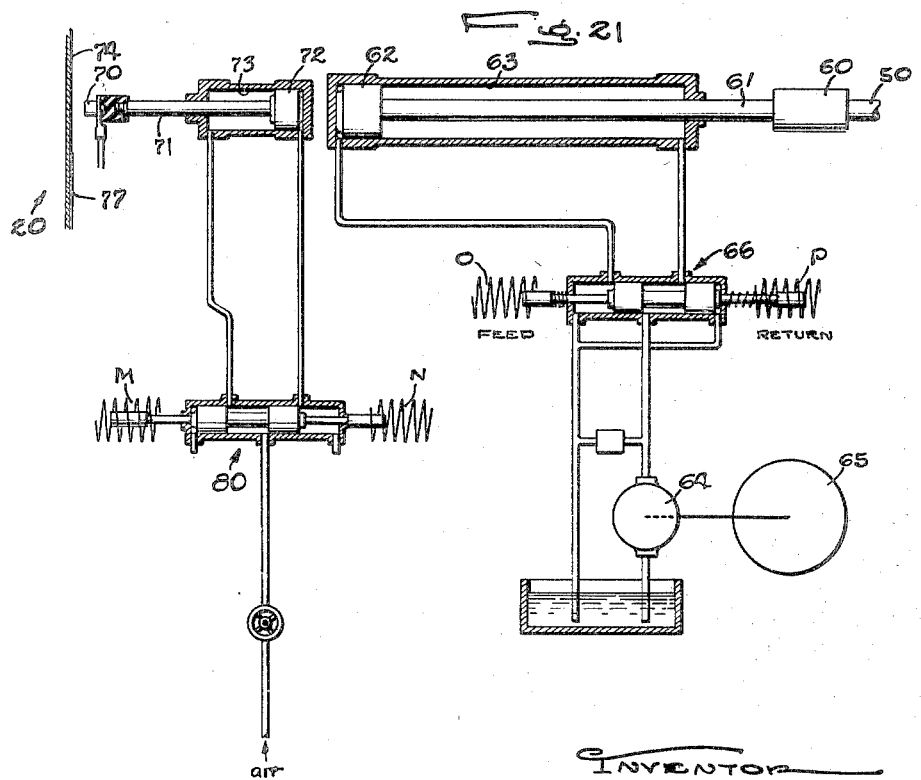

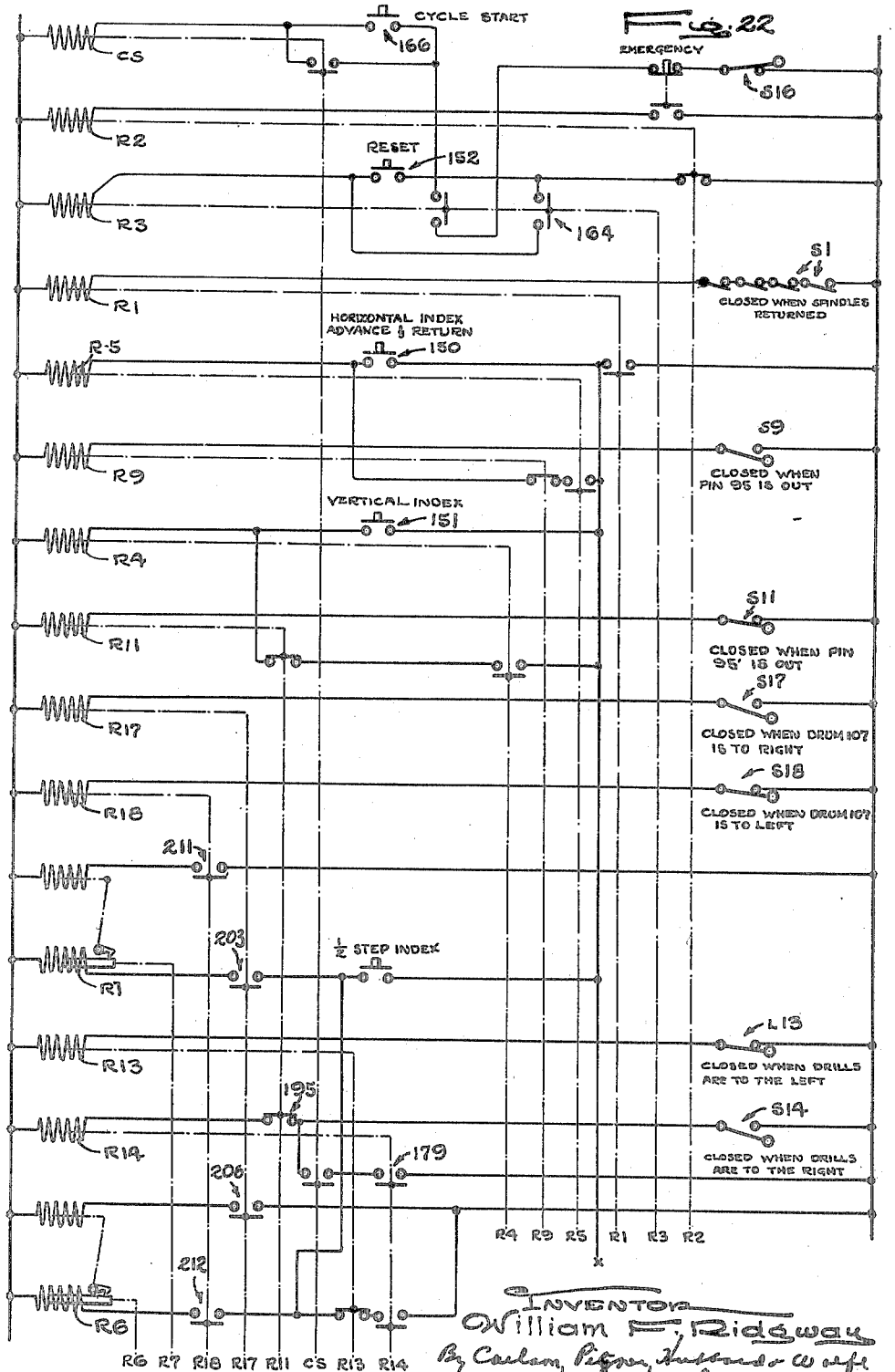

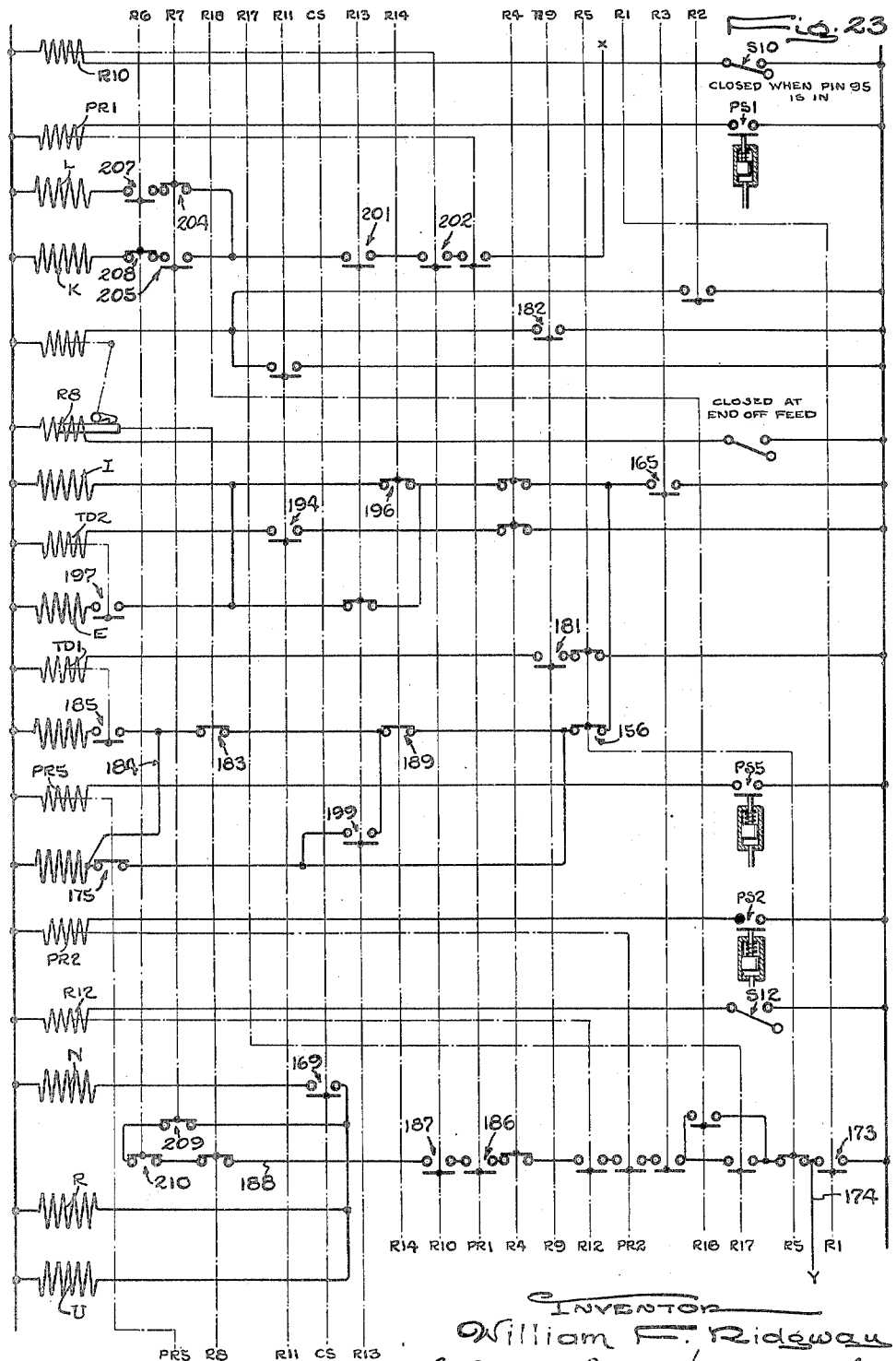

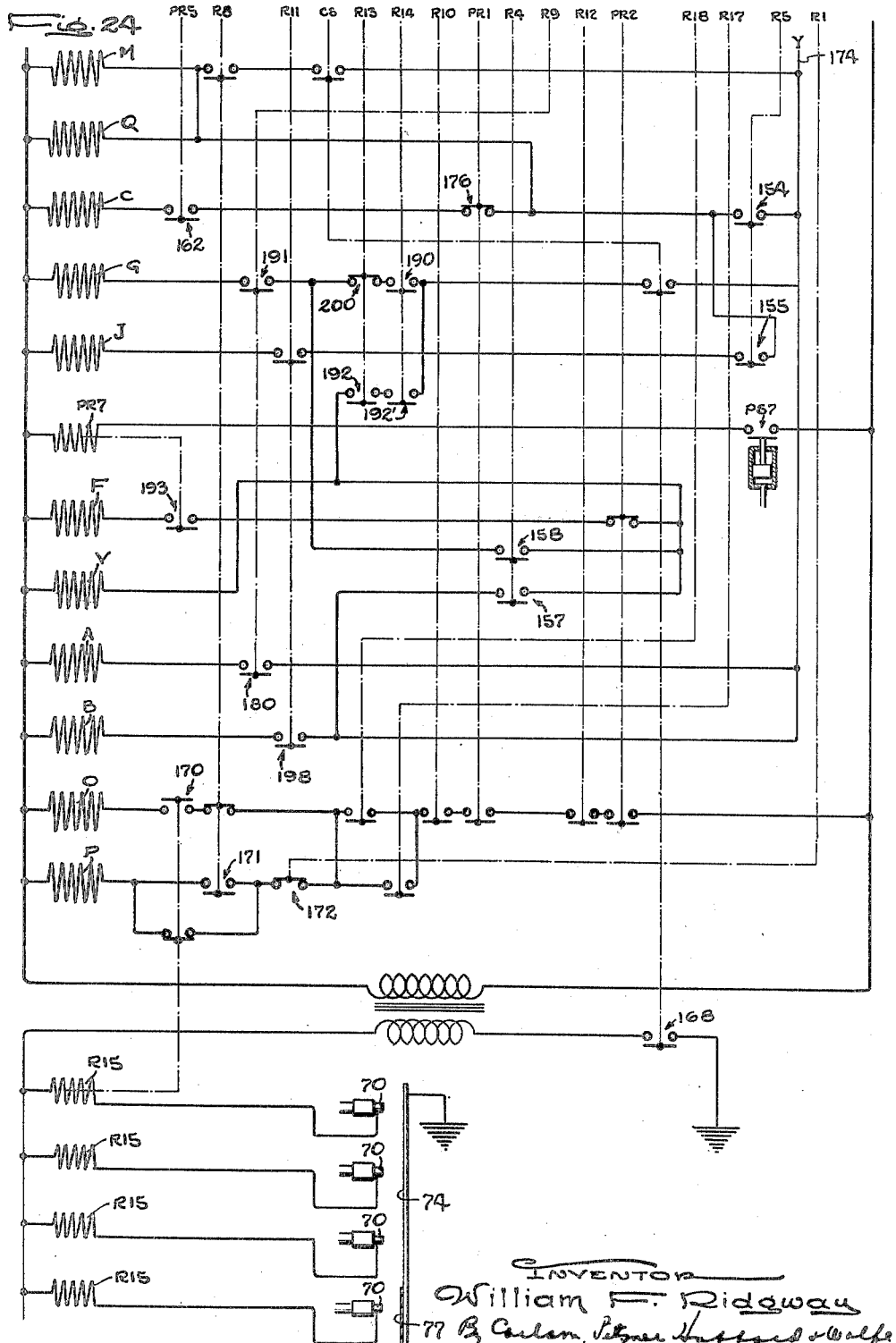

United States Patent Office 2,757,560
Patented Aug. 7, 1956

2,757,560

AUTOMATIC DRILLING MACHINE

William F. Ridgway, Rockford, Ill., assignor to The Ingersoll Milling Machine Company, Rockford, Ill., a corporation of Illinois Application June 8, 1950, Serial No. 166,865

5 Claims. (Cl. 77—22)

This invention relates to an automatic drilling machine, and the primary object is to provide a drilling machine which operates in an automatic machine cycle to form in a workpiece a series of holes arranged in a predetermined pattern.

Another object is to operate the drilling machine in automatically repeated positioning and drilling cycles to form a succession of holes arranged in a plurality of rows.

A further object is to modify the control of the drilling cycles automatically so as to stagger the holes of the different rows.

Still another object is to arrange the drills in multiple for drilling different areas of a workpiece and control the simultaneous operation of all of the drills by means of a single cycling mechanism.

A further object is to provide, in a multiple drilling machine of the above character, a novel control for rendering the different drills operative selectively according to the hole pattern to be produced in the work.

Another object is to provide a novel mechanism for adjusting the drill positions selectively in a plurality of different patterns.

A further object is to modify the action of the indexing mechanism in a novel manner for staggering the holes of adjacent rows.

Still another object is to associate the cycle control pattern with the tool indexing mechanism in a novel manner so as to utilize the latter in positioning the pattern and the feelers therefor in proper association at all times.

The invention also resides in the simple and novel construction of the mechanism for staggering the holes formed in the workpiece, in the novel manner of utilizing the pattern to control the parts of the automatic machine cycle, in the novel means employed for facilitating disengagement of the indexing elements, and in the novel arrangement of the tool heads which permits drilling of the work at a plurality of points simultaneously.

Other objects and advantages of the invention will become apparent from the following detailed description taken in connection with the accompanying drawings, in which Figure 1 is a side elevational view of a drilling machine embodying the novel features of the invention, part of the workpiece being broken away and shown in section.

Fig. 2 is a fragmentary front elevational view.

Fig. 3 is a fragmentary plan view.

Fig. 4 is a fragmentary sectional view taken along the line 4—4 of Fig. 3.

Figure 1:
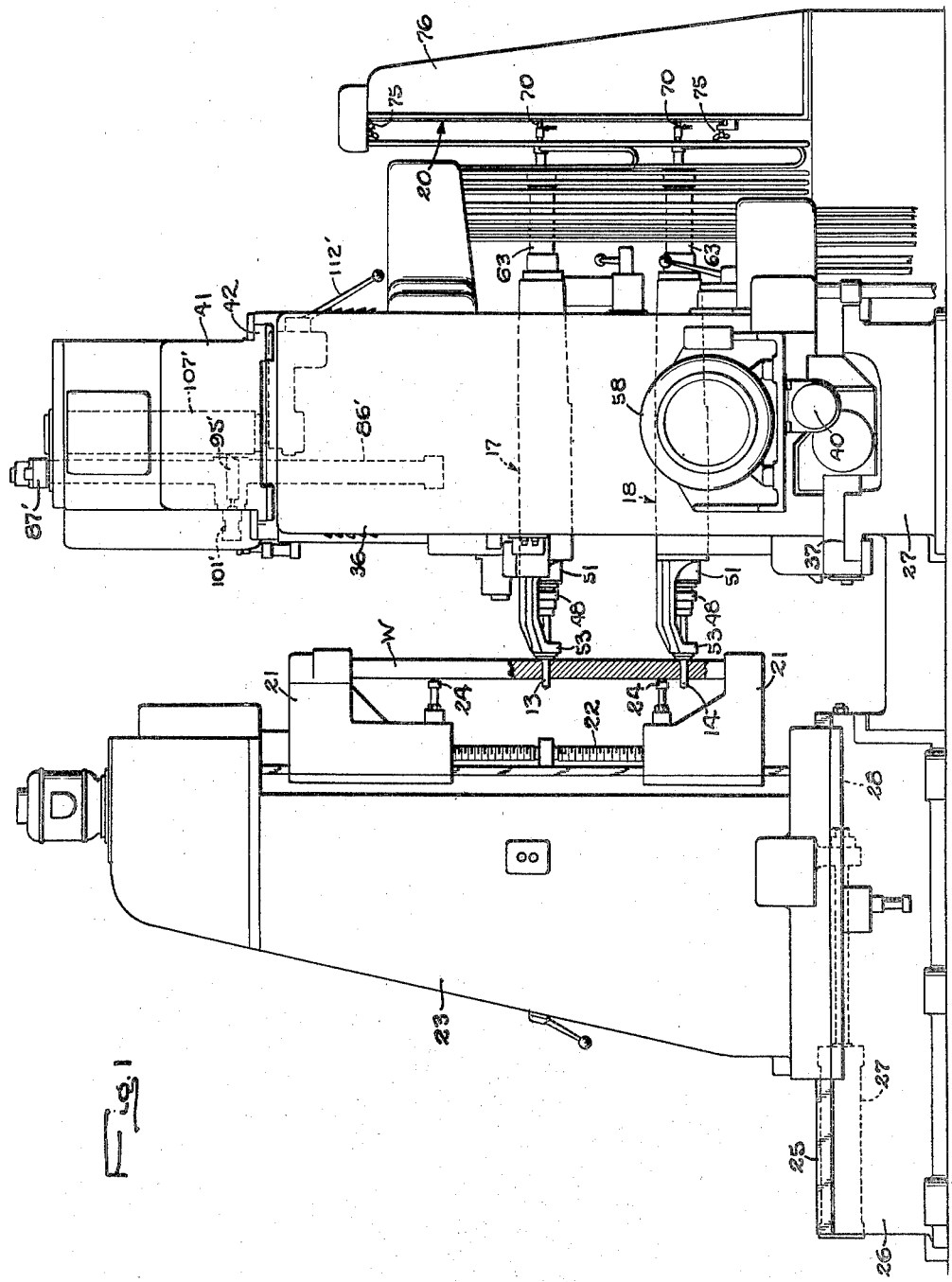

Figs. 5 and 6 are fragmentary sectional views taken respectively along the lines 5—5 and 6—6 of Fig. 4.

Fig. 7 is a fragmentary sectional view taken along the line 7—7 of Fig. 6.

Figs. 8 and 9 are fragmentary sectional views taken respectively along the lines 8—8 and 9—9 of Fig. 4.

Fig. 10 is a fragmentary sectional view taken along the line 10—10 of Fig. 3.

Fig. 11 is a fragmentary plan view of a portion of Fig. 3.

Fig. 12 is a fragmentary sectional view taken along the line 12—12 of Fig. 2.

Fig. 13 is an elevational view of the control pattern.

Figs. 14 through 17 are diagrammatic views of a workpiece at different points in the machine cycle.

Fig. 18 is a diagrammatic view of the principal operating parts of the machine.

Fig. 19 is a schematic view and hydraulic circuit diagram of the tool indexing mechanism.

Fig. 20 is a schematic view and hydraulic circuit diagram of the clamping mechanism.

Fig. 21 is a schematic view and hydraulic circuit diagram of the pattern feeling and tool feeding mechanism.

Figs. 22, 23, and 24 are electrical circuit diagrams.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

For purposes of illustration, the invention is shown in the drawings embodied in a multiple tool machine for drilling in a work plate W a multiplicity of holes 10 (see Fig. 17) arranged in a plurality of rows with the holes of the adjacent rows staggered relative to each other. In this instance, the workpiece is circular having a continuous undrilled peripheral band 11 connected along perpendicular diameters by imperforated areas which divide the workpiece into four quadrants I, II, III, and IV in which the holes are formed by separate power actuated drills 12, 13, 14, and 15.

In general, the four drills are disposed horizontally and mounted on heads 16, 17, 18, and 19 (Figs. 2, 3, and 18) adjustable relative to each other in two transverse directions, horizontally and vertically in this instance, so that after an initial spacing of the drills to corresponding positions in the different quadrants all four drills and the workpiece may be indexed relative to each other along the rows horizontally and in unison to new hole positions after which all of the heads are shifted vertically in unison preparatory to forming the holes of the next row. In each advance of the drills toward the work, the individual drills are rendered operative or inoperative selectively under the control of a pattern 20 (Figs. 1, 3, 12, and 13) so that only those drills which are positioned opposite work areas to be perforated will operate in the next advance of the drills and work toward each other.

Referring first to Figs. 1 and 3, the work plate W is disposed in vertical position and held between two clamps 21 actuated by individually operable power rotated screws 22 and slidable along ways on a column 23 which supports adjustable abutments 24 for backing the work at a plurality of points. By operating the screws 21ᵃ, the workpiece may be located at any desired height in relation to the drills 12 and 13. The column is supported on horizontal ways 25 on a T-shaped bed 26 supporting a hydraulic servo 27 by which the column may be shifted back and forth toward and from a limit position determined by an adjustable stop 28.

The housings of the tool heads 16 and 19 are spaced apart and slidable along vertical ways 30 (Figs. 2, 12, and 18) on a column 31 which is supported by and slidable along horizontal ways 32 on a lateral extension of the machine bed 27 to which the column may be secured rigidly by a hydraulically actuated clamp 34. In a similar way, the heads 17 and 18 are vertically spaced and slidable along ways 35 on a column 36 which is adjustable along horizontal bedways 37 and adapted to be secured thereto by another clamp 34. The upper ends of the columns are bridged by a member 41 (Figs. 1, 2, and 3) which is secured rigidly to the column 31 and has way surfaces 42 thereon slidable in complemental horizontal ways on the upper end of the column 36.

To adjust the two pairs of heads 16, 19 and 17, 18 toward and away from each other horizontally, a screw 33 (Figs. 2 and 18) journaled and held against endwise movement on the column 36 threads into a nut 38 on the column 31. Through suitable reduction gearing, the screw may be turned by a reversible electric motor 40 so as to move one or the other of the columns toward and away from the other along the bed. The column thus moved is selected by releasing its clamp 34, the other clamp remaining applied. When both of the clamps 34 are released, the two columns 31 and 36 and the four drill heads may be shifted as a unit along the horizontal ways 32 and 37.

The four drill heads are interconnected for vertical adjustment relative to each other and for vertical movement in unison along the ways 30 and 35. To this end, the upper and lower heads of each pair are connected by a screw 43 (Figs. 2, 12, and 18) threading into a nut 44 on the upper head and journaled in suitable thrust bearings on the lower head. Through suitable reduction gearing, the screws may be turned by reversible electric motors 45 mounted on the lower heads 18 and 19. The upper heads 16 and 17 are interconnected through a bar 46 rigid with the head 17 and projecting horizontally into a guide 47 in the head 16.

Each drilling tool is held in a chuck 48 (Figs. 1 and 12) journaled on the end of a spindle 50 which is journaled in suitable thrust bearings in a quill 51 slidable in a tubular casing 52 which projects through and is fixed in the drill head and carries at its forward end a guide 53 for the drill. The rear end portion of each spindle 50 is splined into one terminal gear 54 of a speed reducing train whose other terminal is a bevel gear 55 journaled in thrust bearings on the drill head. The bevel gears on the heads 16 and 19 are alined axially and spline coupled to a vertical shaft 56 which is bevel geared at its lower end (see Fig. 18) to the output shaft of a speed reducing mechanism 57 mounted on the column 31 and driven by an electric motor 58. The spindles 50 on the other two drill heads 17 and 18 are similarly mounted and power driven in all of the different positions of vertical adjustment of the heads.

Beyond its drive gear 54, each spindle is joined by a suitable thrust coupling 60 (Fig. 12) to the rod 61 of a piston 62 (Figs. 12 and 21) slidable in a cylinder 63 which is secured to the rear end of the casing 52 of the drill unit. Pressure fluid delivered by a pump 64 driven by a motor 65 is directed to opposite ends of the feed cylinders 63 under the control of individual valves 66. When the solenoid P of any valve is energized as shown in Fig. 21, fluid is directed to the rod end of the cylinders to retract the drill out of the work. Conversely, the drills are fed toward and into the work when their solenoids O are energized, the ends of the cylinders serving as stops to limit the advance and return motions.

Selective energization of the drill actuator is controlled by the pattern 20 above referred to which, in accordance with one aspect of the invention, coacts with feelers 70 carried on the respective drill heads 16, 17, 18, and 19 so that the mechanism by which the drills are indexed and positioned horizontally and vertically may also be used to bring the feelers into operative association with points of the pattern corresponding to the prevailing positions of the respective drilling tools. To this end and to enable the feelers to operate electrically, each feeler comprises an electrical contact corresponding in effective size to the diameter of the drills and projecting rearwardly from a block of insulation on the rear end of a rod 71 axially alined with the drill spindle 50 and fixed to a piston 72 slidable in a cylinder 73 which is mounted on the rear end of the casing 52 of the drill unit.

Cooperating with the feeler contacts 70 to form switches is a metal plate 74 corresponding in size to the work plate W and fastened as by clamps 75 (Fig. 1) against the vertical face of a column 76 upstanding from and fixed to the bed 27 beyond the rear ends of the drill units. This plate cooperates with a mask 77 of insulating sheet material cemented against the face of the plate 74 and cut away to expose one or more areas of the plate corresponding to the areas to be perforated on the workpiece. In this instance, the cut away portion of the mask is a circle of a diameter equal to that of the work band 11.

After lateral positioning of the work spindles and prior to each advance thereof, pressure fluid such as air is admitted to the head ends of the cylinders 73 to project the feelers 70 against the pattern, this being effected by energizing a solenoid M of a valve 80 (Fig. 21). Those feelers which are disposed opposite the mask opening will engage the plate 74 and thus complete a circuit by which the associated drill unit is fed forwardly to drill the work. Those feelers which engage the mask 77 fail to complete a circuit and the feed mechanism of the associated drill unit is thus held disabled. After the drills have advanced and returned, the feelers are retracted in response to energization of the valve solenoid N.

Power for indexing the two columns 31 and 36 and the four drill heads thereon in unison along the bed 27 is supplied in the present instance by a hydraulic servo comprising two pistons 82 (Figs. 3, 18, and 19) slidable in cylinders 83 which are formed in a housing 84 secured to the bed outwardly beyond the columns 31. The piston rods 85 project outwardly from the cylinders and are disposed horizontally on opposite sides of a rod 86 fixed to the column 31 near the base thereof (see Fig. 18) and guided in spaced bearings 86' on the housing 84 (see Fig. 4). The shouldered outer ends of the rods 85 and 86 are clamped adjustably to a plate 87. A pump 88 (Fig. 19) driven by a motor 90 delivers pressure fluid to the opposite ends of the cylinders 83 under the control of a valve 91 having a plunger normally spring centered to interrupt the flow to the cylinders but shiftable by the energization of one of two solenoids H and G to admit fluid to the head and rod ends of the cylinders. The limit left hand or starting position of the drill heads is determined by engagement of the pistons 82 with the heads of the cylinders 83 as shown in Fig. 19 and may be adjusted by inserting washers 94 of varying thicknesses between the rods 85 and the plate 87.

The lengths of the indexing movements of the drill heads are determined by engagement between a retractible pin 95 (Figs. 1, 4, 6, 7, 18, and 19) and one of a plurality of teeth 96 spaced along a bar 97 according to the desired spacing of the holes 10 in each horizontal row. In this instance, the pin 95 is guided in vertical ways in an enlargement 98 intermediate the ends of the rod 86 from which the pin projects downwardly. The pin is secured to the end of a rod on a piston 100 slidable in a cylinder 101 on the actuator rod 86.

When a solenoid C (Fig. 19) of a valve 103 is energized, pressure fluid from a line 104 supplied by the pump 88 is admitted to the lower end of the cylinder 101 thus raising the piston and retracting the pin 95 slightly above and out of engagement with the teeth 96 of the index bar 97 as shown in Fig. 19. Conversely, when the valve solenoid D is energized, the valve plunger is shifted to admit pressure fluid to the head end of the cylinder thus projecting the pin downwardly as shown in Fig. 4 and into engagement with the teeth 96 which have inclined back surfaces that cooperate with the inclined end 106 of the pin to guide the latter into full engagement with the square face of the tooth.

It will be apparent from the foregoing that when the pin 95 while engaging one of the teeth 96 is retracted momentarily and then projected downwardly immediately, the columns 31 and 36 and therefore the drill heads may be advanced one step or until the face of the next tooth comes against the pin 95 where it is held firmly by the continued energization of the indexing servo 82, 83.

To adapt the machine for forming work holes 10 differently spaced apart horizontally, provision is made for bringing other index bars 97ª—97ᵈ (Figs. 4, 5, and 10) into operative association with the pin 95, the teeth on these bars being differently pitched. For this purpose, the bars are spaced angularly around and secured detachably to a drum 107 which is journaled in bearings 108 on the stationary housing 84. One end of the drum is spline coupled to a shaft 110 (Figs. 4 and 10) bevel geared as shown to a rockshaft 111 upstanding from and journaled on the bed 27. By turning a hand lever 112 on the shaft, the index drum 107 may be turned to different selected positions (Fig. 11) to bring a selected one of the toothed bars 97 into association with the pin 95. Suitable means (not shown) is provided for retaining the shaft 111 in the selected position.

To enable the holes 10 of the adjacent rows on the workpiece to be staggered relative to each other while using a single toothed bar 97 to control the indexing movements along all of the rows, means is provided for relatively shifting the pin 95 and the index bar 97 longitudinally of the latter and at the start of the successive rows. Herein, the shifting movement, which is equal to one half the length of the indexing step, is imparted to the bar 97 by a hydraulic servo capable of overriding the main indexing servos 82, 83 and comprising a piston 115 (Figs. 4 and 19) reciprocable in a stationary cylinder 116 in the housing 84 and fast on the end of a rod 117 which projects rigidly from the rear end of the index drum 107.

Pressure fluid from the supply line 104 is admitted to opposite ends of the cylinder 116 under the control of a valve 118 (Fig. 19) whose plunger is shiftable by solenoids L and K. When the latter is energized causing fluid to be admitted to the head of the cylinder, the piston 115 and the index drum are shifted to the left to the limit position shown in Fig. 4 which, when the pin 95 is engaging the first tooth 96 on the index bar, determines the initial position of the drills for starting the holes of one row. If at the time of this shift, the servos 82, 83 are energized so as to hold the pin against a tooth of the bar, these servos will be overcome, and the columns 31 and 36 and the drill heads thereon will be moved.

When the valve position is reversed and fluid is admitted to the rod end of the cylinder 116, the movement of the piston 115 and the index drum 107 to the right as shown in Fig. 19 is limited by engagement of projections 123 (Figs. 4, 8, and 9) rigid with a plate 124 on the end of the drum 107 cooperating with arcuate stops 122 disposed on opposite sides of the drum axis and fixed to a plate 125 rigid with the housing 84 at the end of the bearing 108. The lengths of these stops in a direction axially of the drum 107 is correlated with the pitch of the teeth on the active index bar 97 and with the desired staggering of the holes in adjacent rows in the workpiece. For example, if, as in the present instance, each hole of one row is to be located midway between the adjacent holes of an adjacent row, the range of shifting of the drum 107 by the servo 115, 116 would, as determined by the length of the fixed stops 123, be one half the spacing of the index teeth 96.

The amount of the shift of the drum 107 must vary with the pitch of the index teeth 96, and, therefore, must be changed whenever a different one of the index bars 97 is brought into active position. To effect this change automatically as an incident to the selection of a new index bar in the manner described above, additional pairs 122ª—122ᵈ (see Fig. 9) of stops are employed and brought into operative association one at a time with the projections 123 when the corresponding index bar 97ª—97ᵈ respectively are brought into active position. By making the stops and projections of short arcuate length with those of each pair differently spaced from the drum axis, the required number of the projections 122 may be accommodate around the face of the plate 125 as shown in Fig. 9. Thus, with the parts positioned angularly as shown in Figs. 8 and 9, the stops 122 will engage the projections 123. If now the drum 107 is turned through an eighth of a revolution to bring the index bar 97ª into operative association with the pin 95, the projections 123 will be alined with the stops 122ª and engage the latter when the drum is next shifted to the right. In a similar way, the projections 123ᵇ—123ᵈ become alined with the stops 122 when the index bars 97ᵇ—97ᵈ respectively are brought into operative position. As shown, the stops 122ᵇ and 122ᵈ are extensions of the stops 122ª and 122ᶜ because the pitch of the corresponding bars is the same, the bars being differently positioned on the drum 107 to effect proper spacing of the holes 10.

Means, used in controlling the automatic machine cycle, are provided for detecting the presence of the drill heads in their extreme left hand or starting position as viewed in Figs. 2 and 3 as determined by movement of the indexing pistons 82 to the rod ends of their cylinders as shown in Fig. 19. As shown in Fig. 6, this means includes a limit switch S13 mounted on the stationary housing 84 and positioned along the index rod 86 for engagement of its actuating arm 126 by a dog 127 when the index rod 86 reaches its left hand limit of travel. The dog is on a bar 128 bolted to the side of the enlargement 98 in which the pin 95 is guided. A similar switch S14 (Fig. 6) spaced along the rod 86 from the switch S13 is adapted to be actuated by a dog 130 adjustable along the rod 128 and fastened to the latter in a position to actuate the switch S14 when the pin 95 reaches the tooth 96 on the index bar 97 corresponding to the last right hand hole 10 to be drilled in each row on the workpiece.

Similar switches S17 and S18 (Figs. 5, 6, and 11) are stationarily mounted on the machine bed and arranged to be actuated in the opposite limit positions of the index drum 107 and the servo piston 115. For this purpose, a lever 131 is fulcrumed at 132 on the stationary housing 84 with one end riding in a groove 133 at the inner end of the index drum. The other end of the lever is positioned for engagement with the spaced actuating arms of the two switches.

Movements of the index pin 95 out of and into engagement with the teeth 96 of the active index bar 97 are detected by switches S9 and S10 (Fig. 7). These switches are stationarily mounted with their actuating arms positioned for engagement with lugs 134 mounted on one side of the pin 95.

Indexing of the drill heads 16 to 19 vertically and in unison to determine the vertical spacing of the rows of holes 10 in the workpiece is effected by a second hydraulically actuated mechanism (Figs. 1, 2, 12, 18, and 19) which except for the omission of the half step endwise adjustment of the indexing bars is a duplicate of the construction to the horizontal indexing mechanism above described, the corresponding parts being indicated by the same but primed reference numerals. The servo cylinders 83' of this vertical indexing mechanism are mounted on the crossrail 41 and the actuating rod 86' hangs downwardly between the columns 31 and 36 and is connected at 135 (Figs. 2 and 18) with the drill head 16 which is adjustably connected as described above with the other four drill heads 17, 18, and 19. The flow of pressure fluid from the line 104 to opposite ends of the servo cylinders 83' is controlled by a valve 136 (Fig. 19) having a spring centered plunger movable to opposite positions by the energization of solenoids J and I. The lowermost position of the drill heads when the pistons 82' are at the lower ends of the cylinders 83' as shown in Fig. 19 is detected by actuation of a switch S15 which is operated in the same manner as the switch S13 above described. A switch S16 is actuated when the drill heads reach their uppermost position corresponding to the upper row of holes in the workpiece.

Advance and retraction of the index pin 95' is detected by switches S12 and S11 (Fig. 19) and is produced by the servo 100', 101' under the control of a valve 140. The plunger of the latter is shiftable in opposite directions by the energization of solenoids F and E.

Provision is made for relieving the heavy pressure between the index pin 95 and each tooth 96 to facilitate withdrawal of the pin by its actuator 100, 101. This is accomplished by utilizing the valve 103 by which the pin actuator is energized to momentarily reverse the energization of the servo 82, 83 by which the indexing movement is produced. To this end, an auxiliary port 143 (Fig. 19) in the cylinder of the valve 103 is covered by one or the other of the spaced lands 144 on the valve plunger 145 when the latter is in its opposite limit positions. However, when the valve is shifted by energization of one of the solenoids C or D, the groove encircling the plunger 144 between the lands passes across the port 143 thus permitting pressure fluid to escape therethrough and act momentarily on the piston of a valve 146 which is moved upwardly against the action of its spring 146$^a$. Pressure fluid from the line 104 is thus allowed to pass momentarily to a spring opened valve 147 which, if allowed to open by deenergization of a solenoid A, directs the high pressure fluid through an auxiliary conduit 149 and a check valve 177 to the rod ends of the cylinders 83. For the short interval that the fluid is thus admitted through the valve 146, the head ends of the cylinders 83 will, as later described, be connected to the drain thus allowing the pistons 82 to move to the left momentarily whereby to relieve the pressure between the pin 95 and the tooth of the index bar 97. As will appear later, the solenoid A is maintained energized and the valve 147 held closed during the return or left hand motion of the index bar 97.

In a similar way, the pressure between the pin 95' and the engaged tooth 96' of the vertical index mechanism is relieved automatically by the momentary admission of pressure fluid to a port 143' (Fig. 19) as the plunger of the valve 140 is shifted from one position to the other. The pressure thus exerted on the piston of a spring closed valve 146' permits pressure fluid to flow momentarily through a valve 147' and a check valve 177' to the rod ends of the cylinders 83', the relieving action being the same as described above. The valve 147' is opened by a spring and closed during the energization of a solenoid B which is deenergized only during the return or resetting movement of the vertical indexing mechanism.

*Operation in general*

The machine above described operates in a completely automatic cycle to cause the drills 12, 13, 14, and 15 to form all of the holes 10 in the workpiece as shown in Fig. 14 starting with the holes 10$^a$ and proceeding upwardly row by row to the last hole 10$^b$ in the uppermost row. More particularly, the horizontal and vertical indexing mechanisms above described are first returned to the left and lowered to the zero position in which the drills are disposed opposite points $a$ (Figs. 14 and 15) after which the heads are shifted to the right and upwardly bringing the pins 95 and 95' against the first teeth 96 and 96' of the index rack bars 97 and 98', the drills then being alined with points $b$ on the work as shown in Fig. 15. The feelers 70 will be alined with corresponding points on the pattern 20 so that those in the first, second, and fourth quadrants will, when the feelers are projected outwardly, engage the metal plate 74 and close the circuits for energizing the servos for feeding these drills into the work. The feeler in the third quadrant is then disposed outside of the third quadrant and therefore engages the mask 77 so as to maintain the actuator for the drill 14 disabled. Three holes 10$^a$ as shown in Fig. 15 are thus formed in the workpiece in the ensuing advance of the drills.

After drilling each hole and retraction of the drills, the pin 95 is withdrawn to permit the index servo to move the drill heads to the right one step whereupon the feelers 70 and the drill actuators are operated as before to form the three holes $c$, the drill 14 then in position $d$ still remaining inactive. This procedure is repeated step by step to form the first row of eight holes by the drills 12 and 13 and two holes only by the drills 14 and 15 as shown in Fig. 16. On completion of the last holes $e$ in the rows, the horizontal indexing mechanism operates to return the drills left to the zero line at $f$ whereupon the vertical index mechanism raises the heads one step and the half step servo 115, 116 operates in conjunction with the index servo 82, 83 to shift the heads horizontally and bring the drills to the positions $g$ (Fig. 17) with the pin 95 engaging the first tooth 96 and the pin 95' engaging the second tooth 96'. The drill actuators and the horizontal indexing mechanism are operated in repeated cycles as before to form nine holes $h$ in each row in the upper quadrants and four holes $h$ in the second rows in the lower quadrants. Since the index bar 97 is held in its left hand position by the auxiliary servo 115, 116, the holes $h$ will be staggered relative to the holes $c$ of the first row.

When, after completion of the second row of holes, the drill heads are returned to the zero line and shifted upwardly one step and to the right to again bring the pin 95 against the first tooth 96, the auxiliary servo 115, 116 will also be reversed to shift the index bar 97 and the drill heads to the right thus bringing the drills to the positions $k$ which are in vertical alinement with the first holes 10$^a$ of the first horizontal rows. The holes of the third row are drilled after successive indexing movements and after the completion of each row, the drills are returned automatically to the zero line $m$, indexed vertically, and horizontally preparatory to starting a new horizontal row of holes.

In each hole forming cycle, the individual drills are rendered operative or maintained idle under the control of the feelers 70 which are projected against the pattern as a preliminary to each advance of the drills after indexing thereof to a new position. As a result, the number of holes drilled in each horizontal row of the upper quadrants decreases beginning with the ninth row while conversely the number of holes in rows of the lower quadrants increases progressively beginning with the lowermost row and, after the ninth row, remains substantially constant to the uppermost rows in these quadrants. The result is that each drill, when positioned outside of the outer band 11 of the workpiece as indicated by the crosses in Fig. 14, will be held disabled during the ensuing advance of the other drills. The holes drilled in the workpiece are thus arranged in a circular pattern with the holes of adjacent horizontal and vertical rows staggered relative to each other, the spacing of the holes in the horizontal and vertical rows being determined by which of the index bars 97$^a$ to 97$^d$ and 97'$^a$ to 97'$^d$ are selected and brought into operative association with the pins 95 and 95'.

*Automatic control of machine cycle*

The drilling of the workpiece in the manner above described is a continuous automatic cycle comprising successive indexing and drilling movements for each row and repositioning of the drills to start a new row is effected by energizing the various valve actuating solenoids above referred to in the proper sequence under the control of switches actuated at the limits of the motions of the different machine parts as above described. A typical electrical circuit for effecting such automatic and sequential control is shown for purposes of illustration in Figs. 22, 23, and 24 when arranged one below the other. While this diagram shows the various circuits in considerable detail, certain of the interlocking and preparatory circuits are, for the sake of simplicity, omitted from the following description. In the case of each control relay, the switches actuated thereby are connected to the relay coil by dot-dash lines and shown in the deenergized condition of the relay.

Assuming that the various pump drive motors are operating and that the pattern 20 is prepared, and the drill heads and horizontal and vertical indexing mechanisms are adjusted according to the hole pattern to be produced on the work, the machine described above may be prepared for starting a new cycle by pressing the horizontal, vertical, and reset button switches 150, 151, and 152 (Fig. 22) one at a time. Closure of the first switch energizes its relay R5, the switches 154 and 155 (Fig. 24) of which complete a circuit for the solenoids C and G thus causing the valves 103 and 91 to direct pressure fluid to the rod ends of the cylinders 101 and 83. As a result, the pin 95 is withdrawn and the drill heads are shifted by the servo 82, 83 to the left hand limit of their stroke. The pin 95 remains withdrawn so long as the push button is held depressed because the then open relay switch 156 disables the solenoid D. A solenoid Q is always energized simultaneously with the solenoid C to shift a valve 159 (Fig. 20) and reverse the energization of the hydraulic actuators for the clamps 34 thus releasing the latter, a condition indicated by a pressure responsive switch PS5 controlling a relay PR5 (Figs. 20 and 23) having a switch 162 which is included in the energizing circuit of the solenoid C. Thus, the withdrawal of the pin 95 is conditioned on the release of the clamps 34.

A relay R4 energized by the second push button switch 151 closes switches 157 and 158 to energize the solenoids F and J whereupon the valves 140 and 136 direct fluid to the cylinder 101' and 83' to lower the drill heads to the positions $a$ (Fig. 15). A solenoid V (Fig. 24) is always energized simultaneously with the solenoid F and operates to shift a valve 160 (Fig. 20) to reverse the hydraulic actuators for four clamps 161 (Fig. 2) by which the drill heads are locked in their guideways. Such release of the clamps is indicated by closure of a pressure switch PS7 (Fig. 20) which effects final completion of the circuit above referred to for the solenoid F thus permitting withdrawal of the pin 95' and lowering of the drill heads.

Closure of the reset switch 152 results in energization of a relay R3 which is sealed by its switch 164 and closes a switch 165 (Fig. 23) which effects the energization of the solenoids I, E, D, and H. As a result, the valves 136 and 140 are operated to admit pressure fluid to the head ends of the cylinders 101' and 83', thus projecting the pin 95' into active position and raising the drill heads until the pin encounters the first tooth 96'. In a similar way, pressure fluid is admitted through the valves 103 and 91 to the head ends of the cylinders 101 and 83 to project the pin 95 inwardly and shift the columns 31 and 36 to the right until the first tooth 96 is engaged. The drills are then disposed in the position $b$ (Fig. 15), pressure fluid at this time being applied to the rod end of the cylinder 116 (Fig. 19) through the valve 118.

With the machine thus conditioned, the drilling cycle is initiated by depressing a start button 166 whose switch engages a relay CS (Fig. 22) sealed by its switch 167 and closing a switch 168 for preparing the circuit through the feelers 70. Another switch 169 (Fig. 23) is also closed to energize the solenoid N and shift the valve 80 (Fig. 21) to admit compressed air to the head ends of cylinders 73 by which the feelers are projected against the pattern 20. Those feelers which encounter the conductive area 74 of the pattern complete circuits for energizing their relays R15 whose switches 170 energize the several solenoids O only one of which is shown in Figs. 21 and 24. The spring centered valves 66 (Fig. 21) are thus shifted to admit pressure fluid to the head ends of the cylinders 63 for feeding the active drills forwardly thus forming three holes in the work at the points $b$.

At the completion of the forward feed of the drills, switches S5 (Figs. 2 and 23) are closed energizing relays R8 (only one of which is shown) which are latched in energized position and actuate several switches 171 which effect energization of the solenoid P for actuating the valves 66 to return the drill spindles. Upon completion of such return of all of the heads, limit switches S1 (Figs. 2 and 22) are closed and a relay R1 is energized to actuate switches, one including a switch 172 (Fig. 24) which opens the circuit for the drill return solenoids P thus permitting the valves 66 to center themselves and lock the spindles. Another switch 173 (Fig. 23) is closed by the relay R1 completing a circuit 174 (Figs. 23 and 24) for the solenoids M (Figs. 21 and 24) by which the valves 80 are shifted to direct air to the rod ends of the cylinders 73 and thus retract the feelers 70 away from the pattern 20. Such retraction breaks the circuit of the relay R15 and prepares the circuit for the next feed advance of the drill spindles.

The solenoids Q for effecting unclamping of the columns 31 and 36 as described above are energized with the solenoids M. Following such unclamping, the pressure build up in the clamps 34 (Fig. 20) closes a switch PS5 which energizes a relay PR5 to open a switch 175 and deenergize the solenoid H and permit the valve 91 to center itself and allow the fluid in the head ends of the cylinders 83 (Fig. 19) to escape to the drain. The reduction in pressure is detected by a switch PS1 (Figs. 19 and 23) which opens to deenergize a relay PR1 to close a switch 176 (Fig. 24). At this time, the rod ends of the cylinders 83 are blocked by check valves 177 and a metering valve 178.

A second switch 162 closed by the relay PR5 completes a circuit with the switch 176 for the solenoid C thus shifting the valve 103 (Fig. 19) to the right to admit pressure fluid to the rod end of the cylinder 101 for withdrawing the pin 95. Such withdrawal is permitted by the slight and momentary retraction of the pistons 82 in the manner previously described in response to the passage of the groove in the valve plunger 145 across the port 143.

Immediately upon retraction of the pin 95, the limit switch S9 is closed to energize a relay R9 whose switch 181 (Fig. 23) energizes a time delay relay TD1 while another switch 180 (Fig. 24) energizes the solenoid A to close the valve 147. A third switch 182 (Fig. 23) is closed by the relay R9 to energize the trip coil of the latched relay R8 which is thus released closing a switch 183. This completes a by-pass circuit 184 for energizing the solenoid H which shifts the valve 91 to again admit pressure fluid to the head ends of the cylinders 83 thus initiating advance of the columns 31 and 36 to the right. As the end 106 of the pin 95 passes the tip of the first tooth 96, the time delay relay TD1 closes its switch 185 completing a circuit for the solenoid D which shifts the valve 103 to project the pin inwardly. The horizontal indexing step is completed when the pin 95 encounters the second tooth 96 and is held against the latter by the continued energization of the indexing servo 82, 83.

When the servo pressure has built up in this servo, the switch PS1 (Figs. 19 and 23) is closed energizing the relay PR1 and the switch S10 is closed by full entry of the pin 95 energizing the relay R10. Switches 186 and 187 closed by these relays cooperate to complete a circuit 188 (Fig. 23) through the then closed switch 173 to energize the solenoid N which, as described above, initiates the advance of the feelers 70 thus starting another drilling cycle to drill the second holes $c$ (Fig. 16). Similar cycles involving advance and return of the drills, and horizontal indexing are repeated to drill the remaining holes successively in the first row.

After completion of the last or eighth hole and the initiation of another horizontal indexing step to the right, the switch S14 (Fig. 6) is closed by the dog 130 energizing a relay R14 which is maintained by its holding switch 179 (Fig. 22). Another switch 189 (Fig. 23) is opened to deenergize the solenoid D thus preventing inward movement of the pin 95 to active position during the ensuing return of the columns 31 and 36 to the left. This return movement of the horizontal indexing mechanism is initiated by closure of a switch 190 also actuated by the relay R14 (Fig. 24) to energize the solenoid G through a switch 191 which is closed when the pin 95 is retracted. The valve 91 (Fig. 19) thus shifted to the right directs pressure fluid into the rod ends of the cylinder 83.

When the pistons 82 reach the left hand ends of the cylinders as shown in Fig. 19 and the drills become alined with the points $f$ (Fig. 14) the switch S13 (Fig. 8) is closed which energizes the relay R13 (Fig. 22) by which movements of several of the parts are controlled. One of these is release of the clamps 161 in response to closing of a switch 192 and the resulting reversal of the energization of the clamp actuators. The pressure built up in the clamps as they are released closes a switch PS7 (Figs. 20 and 24) to energize a relay PR7 whose switch 193 is closed to energize the solenoid F. The valve 140 is thus shifted to admit pressure fluid to the rod end of the cylinder 101' to withdraw the pin 95' when the pressure between the pin and the engaged tooth 96' is relieved in the manner previously described in response to the momentary escape of pressure fluid through the port 143' as the plunger of the valve 140 is shifted. Such withdrawal of the pin 95' closes the switch S11 which energizes a relay R11 (Fig. 22) whose switch 194 (Fig. 23) is closed energizing a time delay relay TD2. A switch 195 (Fig. 22) is also opened to deenergize the relay R14. The switch 196 of the latter is closed completing a circuit for the solenoid I by which the valve 136 is shifted to the right (Fig. 19) to admit pressure fluid to the head ends of the cylinders 83'. This initiates upward movement of the drill heads and as the pin 95' passes the first tooth 96', the relay TD2 closes its switch 197 which energizes the solenoid E to reverse the valve 140 and advance the pin 95'. Another switch 198 closed by the relay R11 energizes the solenoid B to close the valve 147'.

As a result of energization of the relay R13, a switch 199 is closed completing through the then closed switch 189 a circuit for energizing the solenoid H extending through the then closed switch 175. Premature closing of this circuit is prevented by the switch 183 being held open by the latched in relay R8 which remains energized until the pin 95 is retracted causing the relay to be unlatched. The solenoid H reverses the valve 91 and thus energizes the horizontal indexing servo 82, 83 to move the columns 31 and 36 to the right until the pin 95 engages the first tooth 96 the same as at the start of the operation of drilling the holes of the first row. Another switch 200 (Fig. 23) is opened by the relay R13 to prevent the solenoid G from becoming energized.

During the drilling of the first row of holes, the index drum 107 (Fig. 19) is held in its right hand position holding the switch S17 closed and the relay R17 energized to close a switch 203 (Fig. 22). The latter energizes and latches a relay R7 whose switches 204 and 205 are opened and closed respectively in the circuits for controlling the half step servo control solenoids L and K. A switch 206 is also closed by the relay R17 to energize the trip coil of the latched relay R6 and the release of the latter opens a switch 207 (Fig. 23) in the circuit of the solenoid L and closes a switch 208 in the circuit of the solenoid K.

Now, when the switches 201 and 202 are closed by energization of the relays R13 and R10 when the horizontal return index is completed and the pin 95' is reentered, the circuit for energizing the solenoid K is completed shifting the valve 118 to the right and admitting pressure fluid to the head end of the cylinder 116. The piston 115 is thus shifted to the left overcoming the servo 82, 83 and causing the drill heads to be shifted to the left thus bringing the drills to the positions $g$ (Figs. 16 and 17). As an incident to this, the switch S17 is opened and the switch S18 is closed thus preparing the circuits of the half step servo 115, 116 for reverse operation of the latter at the beginning of the operation for drilling the next or third row of holes.

When the drills become positioned at the points $g$ in alinement with the axes of the first holes to be formed in the second row, both of the relays R6 and R7 will be deenergized and unlatched with their switches 209 and 210 closed. The latter coact to complete the circuit 188 above described for energizing the solenoids N and thereby shifting the valves 80 by which the four feelers 70 are caused to advance against the pattern, the same as at the beginning of the operations for drilling the first holes in the first rows as previously described. Closure of the circuit 188 for the solenoid N also effects energization of the solenoids R and U (Fig. 20) for reenergizing the actuators for the clamps 34 and 161 to lock the drill heads and columns in their ways. Thus, the machine cycle proceeds automatically and the holes of the second row are formed successively. After completion of the last or ninth hole in this row, the limit switch S14 is again actuated to repeat the return horizontal indexing movement after which the energization of the relay R13 by closure of the switch S13 again initiates another upper indexing step and movement of the drills to the right until the pin 95 again comes against the first tooth 96 of the index bar. At this time, however, the switch S18 is held closed by virtue of the drum 107 being in its left hand position as shown in Fig. 6. The relay R18 previously energized as described above holds its switch 211 closed thus energizing the trip coil of the relay R7 so as to release the latter closing the switch 204 and opening the switch 205. Another switch 212 also closed by the relay R18 energizes and latches in the relay R6 so that the switch 207 is closed and the switch 208 is opened. Thus, the circuit for the solenoid L is prepared for proper service operation of the half and step indexing servo 115, 116 in the subsequent conditioning of the parts for drilling the third row of holes when the switches 201 and 202 are again closed by the relays R13 and R10.

It will thus be seen from the foregoing that after completion of the holes in each horizontal row, the horizontal and vertical indexing mechanisms operate in conjunction with the half step actuator 115, 116 not only to reposition the drills for the starting of a new higher row of holes but also to initiate the drilling of these holes automatically. Thus, the entire machine cycle for forming all of the holes in the seventeen rows proceeds continuously and is completed without any attention on the part of the machine operator. After completion of the uppermost row of holes and operation of the vertical index mechanism in the manner above described to raise the drill heads upwardly another step, the normally closed limit switch S16 (Figs. 19 and 22) is opened and the cycle start relay CS is deenergized. The cycle is thus terminated with the drills 12, 13, 14, and 15 disposed in the upper left hand corners of the quadrants I, II, III, and IV.

While the connections of the rods 86 and 86' to the housings 31 and 16 are shown as being fixed, these connections may be made adjustable so as to increase the range of the hole patterns which may be drilled.

I claim as my invention:

1. A drilling machine having, in combination, tool and work supports mounted in opposed relation for relative indexing movements along two transverse paths paralleling the face of a workpiece on the work support, separate power actuators for relatively moving said supports along the respective paths, a spindle adapted to carry a drill and mounted on said tool support for movement toward and from said workpiece, a power operator for feeding said spindle forth and back, mechanism automatically controlling the sequential and repeated operations of said actuators and operator in a continuous cycle to drill said workpiece successively at spaced points arranged in one row across the workpiece and then successively at spaced points on the workpiece arranged in an adjacent row, an auxiliary actuator operable when energized to overcome one of said first actuators and relatively shift said supports along one of said paths a distance equal to a fraction of the spacing of said points, and means for energizing said auxiliary actuator after drilling the holes of one of said rows whereby to stagger the holes of the adjacent rows.

2. A drilling machine having, in combination, a work support, a tool support, a spindle on said tool support adapted to support a drill for engagement with a workpiece on the work support, means mounting said supports for movement toward and away from each other and also for relative lateral movement to present the spindle opposite different points on the workpiece, power actuated mechanism operable automatically to index said supports in opposite directions and to feed said spindle toward the work and form adjacent rows of spaced holes successively in said workpiece, an auxiliary power actuator for indexing said supports relative to each other in opposite directions a fraction of the spacing of the holes in one of said rows, and means responsive to the relative movements between said supports to energize said auxiliary actuator in one direction preparatory to starting the holes in one row and in the opposite direction preparatory to starting the holes of the next adjacent row whereby to stagger the holes of the adjacent rows relative to each other.

3. A drilling machine having, in combination, a work support, a tool support, a spindle on said tool support adapted to support a drill for engagement with a workpiece on the work support, means mounting said supports for movement toward and away from each other and also for relative lateral movement to present the spindle opposite different points arranged in adjacent rows on the workpiece, power actuated mechanism operable automatically to index said supports and feed said spindle toward the work and form adjacent rows of spaced holes successively in said workpiece, an auxiliary power actuator for indexing said supports relative to each other longitudinally of said rows and in opposite directions a fraction of the spacing of the holes in one row, and means operable after the completion of each successive row of holes to energize said auxiliary actuator selectively to stagger the holes of the adjacent rows.

4. A drilling machine having, in combination, a work support, a tool support, a spindle on said tool support adapted to support a drill for engagement with a workpiece on the work support, means mounting said supports for movement toward and away from each other and also for relative lateral movement to present the spindle opposite different points arranged in adjacent rows on the workpiece, power actuated mechanism operable automatically to index said supports to bring said spindle opposite the successive points in successive rows and feed said spindle toward the work at each point, and means responsive to the relative movements between said supports preparatory to starting a new row of said holes to shift the supports relative to each other along one of said rows a fraction of the hole spacing.

5. A drilling machine having, in combination, a work support, a tool support, a spindle mounted on the tool support, means mounting said supports for movement along two paths extending laterally of said spindle and transversely of each other, power actuators operable to relatively move the supports along the respective paths, mechanism controlling the advance of said supports relative to each other along one of said paths comprising a rack having a row of teeth thereon spaced apart along the path, a retractible pin adapted for abutting engagement with the successive rack teeth, and mechanism controlling the advance of said supports relative to each other along the second of said paths including a second rack bar having teeth spaced apart along the second path, and a retractible pin adapted for abutting engagement with the successive teeth of said second rack.

References Cited in the file of this patent
UNITED STATES PATENTS

| | | |
|---|---|---|
| 1,069,995 | Anderson | Aug. 12, 1913 |
| 2,381,039 | Churchill | Aug. 7, 1945 |
| 2,483,712 | Schafer | Oct. 4, 1949 |